United States Patent [19]
Desai et al.

[11] 3,843,625
[45] Oct. 22, 1974

[54] PYRAZOLE AZO DYESTUFFS CONTAINING A SULFONYLUREA OR SULFONYLURETHANE SUBSTITUENT

[75] Inventors: Nalin Binduprasad Desai; Onnusami Jayaraman, both of Goregaon-Bombay, India; Visvanathan Ramanthan, Basel; Klaus Artz, Muttenz, both of Switzerland; Navnitrai Nagarji Naik, Goregaon-Bombay, India; Walter Jenny, Basel, Switzerland

[73] Assignee: Ciba-Geigy AG, Basel, Switzerland

[22] Filed: Dec. 15, 1971

[21] Appl. No.: 208,464

Related U.S. Application Data
[63] Continuation-in-part of Ser. No. 806,291, March 11, 1969, Pat. No. 3,679,657.

[30] Foreign Application Priority Data
Mar. 18, 1968 Switzerland.......................... 3958/68

[52] U.S. Cl............... 260/163, 260/158, 260/165, 260/186, 260/202, 260/207, 260/207.1, 260/282, 260/372, 260/376, 260/377, 260/470, 260/455 A, 260/465 D, 260/490, 260/545 R, 260/556 AR, 260/556 AB
[51] Int. Cl.... C09b 29/36, C09b 29/38, D06p 3/52
[58] Field of Search............................ 260/162, 163

[56] References Cited
UNITED STATES PATENTS
2,799,673   7/1957   Bolliger............................. 260/163
2,922,690   1/1969   Mueller et al. ................... 260/158 X
3,324,105   6/1967   Hanke et al. ....................... 260/158
3,366,620   1/1968   Hanke et al. ....................... 260/163
3,379,713   4/1968   Wallace et al...................... 260/158
3,544,548   12/1970  Günther et al...................... 260/152

*Primary Examiner*—Floyd D. Higel
*Attorney, Agent, or Firm*—Joseph G. Kolodny; Edward McC. Roberts; Prabodh I. Almaula

[57] ABSTRACT

Pyrazole azo dyestuffs of the formula:

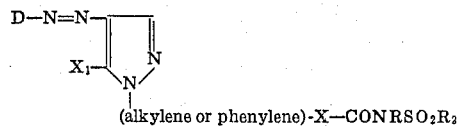

(alkylene or phenylene)-X—CONRSO$_2$R$_2$ wherein D is an optionally substituted phenyl group,
  X$_1$ is —OH or —NH$_2$,
  X is an oxygen atom or an optinally substituted, nitrogen atom
  R is hydrogen, alkyl, or aryl,
  R$_2$ is aryl, and
wherein the pryazole ring may be optionally substituted in the 3-position.

The dyestuffs of this invention are free of sulfonic acid groups and are sparingly soluble or insoluble in water. The dyestuffs are especially useful for dyeing and printing synthetic fibers particularly polyester fibers in fast yellow shades with excellent fastness to light, and to sublimation.

2 Claims, No Drawings

PYRAZOLE AZO DYESTUFFS CONTAINING A SULFONYLUREA OR SULFONYLURETHANE SUBSTITUENT

This application is a continuation-in-part of U.S. Ser. No. 806,291, filed Mar. 11, 1969, now U.S. Pat. No. 3,679,657, which issued July 25, 1972.

The present invention relates to new valuable compounds possessing dyestuff character, which contain at least one group of formula $-X-CO-NR-SO_2-$ wherein R is an acyl group or preferably a hydrogen atom or an optionally substituted alkyl, cycloalkyl, aryl or heterocyclic group, and X is an oxygen or sulphur atom or a group of formula $-NR_1-$, wherein $R_1$ is an acyl group or preferably a hydrogen atom or an optionally substituted alkyl, cycloaklyl, aryl or heterocyclic group.

The groups R and $R_1$ can each for example be methyl, ethyl, propyl or benzyl groups.

The invention for example relates to azo dyestuffs, especially monoazo dyestuffs and disazo dyestuffs, anthraquinones, perinones, quinphthalones, styryl dyestuffs and nitro dyestuffs.

Azo dyestuffs

The particularly interesting dyestuffs include the monoazo dyestuffs of formula $D-N=N-A-NR_1'R_2'$ wherein D is the residue of a diazo component, A is an arylene residue, especially an optionally substituted 1,4-phenylene residue, $R_1'$ and $R_2'$ are each an optionally substituted alkyl group, with at least one of the residues D, A, $R_1'$ and $R_2'$ containing a group of formula $-X-CO-NR-SO_2-R_2$ wherein $R_2$ is a monovalent residue, especially an aliphatic a cycloaliphatic, araliphatic, aromatic or heterocyclic residue, such as for example a methyl, ethyl, n-propyl, n-butyl, cyclohexyl, p-tolyl, 2,5-dimethylphenyl, 4-(chloro, fluoro or bromo)phenyl, benzthiazole-2, pyridyl or thienyl-2 residue.

The diazo residue D is mainly derived from monocyclic or bicyclic amines of formula $D-NH_2$ such as any desired diazotisable heterocyclic amines which do not contain any acid substituents conferring solubility in water, but especially from amines which possess a heterocyclic five-membered ring with two or three hetero-atoms, above all a nitrogen atom and one or two sulphur, oxygen or nitrogen atoms as hetero-atoms, and aminobenzenes, especially those of formula

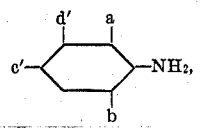

wherein a denotes a hydrogen or halogen atom, or an alkyl or alkoxy, nitro, nitrile, carbalkoxy or alkylsulphone group, b denotes a hydrogen or halogen atom, or an alkyl, nitrile or trifluoromethyl group, c' denotes a nitro, nitrile, carbalkoxy, aryl or alkylsulphenyl group and d' denotes a hydrogen atom, a halogen atom, a carboxylic acid ester group or a carboxylic acid amide group.

The following may be mentioned as examples: 2-aminothiazole, 2-amino-5-nitrothiazole, 2-amino-5-methylsulphonylthiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 5-(methyl, ethyl, phenyl or benzyl)-1,2,4-triazole, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-thiocyanatobenzthiazole, 2-amino-6-nitrobenzthiazole, 2-amino-6-carbethoxybenzthiazole, 2-amino-(4- or 6-)methylsulphonylbenzthiazole, 2-amino-1,3,4-thiadiazole, 2-amino-1,3,5-thiadiazole, 2-amino-4-phenyl or 4-methyl-1,3,5-thiadiazole, 2-amino-5-phenyl-1,3,4-thiadiazole, 2-amino-3-nitro-5-methylsulpho-thiophene, 2-amino-3,5-bis-(methylsulpho)-thiophene, 5-amino-3-methyl-isothiazole, 2-amino-4-cyano-pyrazole, 2-(4'-nitrophenyl)-3-amino-4-cyanopyrazole, 3- or 4-aminophthalimide, aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichlorobenzene, 1-amino-2,5-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carbethoxybenzene, 1-amino-2-chloro-4-methylsulphonylbenzene, 1-amino-2-methylsulphonyl-4-chlorobenzene, 1-amino-2-methylsulphonyl-4-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 4-aminobenzoic acid cyclohexyl ester, 1-amino-2,4-dinitro-6-chlorobenzene and especially 1-amino-2-cyano-4-nitrobenzene, and also 1-aminobenzene-2-, -3- or -4-sulphonic acid amides, such as the N-methylamide or N,N-dimethylamide or N,N-diethylamide.

Diazo components of formula

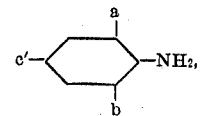

wherein a, b or c' denote a residue of formula $-X-CO-NR-SO_2-R_2$ should be mentioned particularly.

The group A is preferably the residue of formula

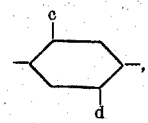

wherein c and d are hydrogen atoms or methyl, ethyl, methoxy, ethoxy, phenylthio or phenoxy residues.

The group c is preferably bonded in the ortho-position to the azo group and can, in addition to the above-mentioned groups, also denote a chlorine or bromine atom, a trifluoromethyl group, an alkylsulphonyl group, preferably a methylsulphonyl group, and an acylamino group which is optionally alkylated, preferably methylated, at the nitrogen atom and in which the acyl residue is the residue of an organic monocarboxylic acid, an organic monosulphonic acid, such as methanemonosulphonic, ethanemonosulphonic or p-toluenemonosulphonic acid, or the residue of a carbamic acid monoester or monoamide or of a carbonic acid monoester or monoamide, such as phenoxycarbonyl, methoxycarbonyl and aminocarbonyl, or the residue of formula $-CO-NR-SO_2-R_2$.

The groups $R_1'$ and $R_2'$ may be hydrogen atoms or lower alkyl groups, that is to say alkyl groups containing one to four, preferably two to four, carbon atoms, such as methyl, ethyl, n-propyl or n-butyl groups which may be substituted in the usual manner such as for example benzyl or β-phenylethyl groups, halogenated alkyl groups, such as β-chlorethyl, β,β,β-trifluorethyl, β,γ-dichloropropyl, β-cyanethyl, alkoxyalkyl, such as β-ethoxyethyl or η-methoxybutyl, hydroxyalkyl, such as β-hydroxyethyl, β,γ-dihydroxypropyl, nitroalkyl, such as β-nitroethyl, carbalkoxy, such as β-carbo-(methoxy, ethoxy or propoxy)-ethyl (with the terminal alkyl group being permitted to carry nitrile, carbalkoxy, acyloxy and amino groups in the ω-position), β- or γ-carbo-(methoxy or ethoxy)-propyl, acylaminoalkyl, such as β-(acetyl or formyl)-aminoethyl, acyloxyalkyl, such as β-acetoxyethyl, β,γ-diacetoxypropyl, β-(alkyl or aryl)-sulphonylalkyl, such as β-methanesulphonylethyl, β-ethanesulphonylethyl or β-(p-chlorobenzenesulphonyl)-ethyl, alkyl- or aryl-carbamoyloxy-alkyl, such as β-methylcarbamyloxyethyl and β-phenylcarbamyloxyethyl, alkyloxycarbonyloxyalkyl, such as β-(methoxy, ethoxy or isopropoxy)-carbonyloxyethyl, γ-acetamidopropyl, β-(p-nitrophenoxy)-ethyl, β-(p-hydroxyphenoxy)-ethyl, β-(β'-acetylethoxycarbonyl)-ethyl, β-[β'-cyano, hydroxy, methoxy or acetoxy)ethoxycarbonyl]-ethyl, cyanalkoxyalkyl, β-carboxyethyl, β-acetylethyl, γ-aminopropyl, β-diethylaminoethyl, β-cyanacetoxyethyl and β-benzoyl-β-(p-alkoxy or phenoxybenzoyl)-oxyethyl groups.

Particularly preferably, $R_1'$ and/or $R_2'$ denote a residue of formula $-$alkylene$-X-CO-NR-SO_2-R_2$, such as for example a β-(N-phenylsulphonyl-N-methylaminocarbonyloxy)-ethyl or a γ-(N-phenylsulphonyl-N-methylaminocarbonylamino)-propyl residue.

The groups $R_1$ and $R_2$ generally contain not more than 18 carbon atoms.

Another preferred type of monoazo dyestuffs has the formula $R_2SO_2-NR-CO-X-D'-N=N-A'$, wherein D' is an optionally substituted p-phenylene residue and A' is the residue of a coupling component such as for example a phenol, an enol, an aromatic amine or a pyrazolone, D' preferably being a residue of formula

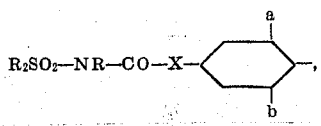

wherein a and b have the same significance as above.

Particularly preferred disazo dyestuffs are those of formula

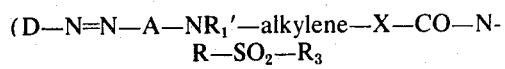

wherein D, A, R, $R_1'$ and X have the same significance as above and $R_3$ is a bivalent organic residue, especially an aliphatic, araliphatic, cycloaliphatic, aromatic or heterocyclic residue such as for example a hexamethylene-1,6- or phenylene-1,3 residue.

Further dyestuffs to be mentioned are the disazo dyestuffs of formula

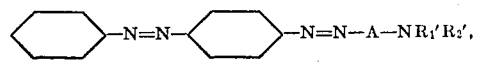

wherein $R_1'$ and $R_2'$ have the same significance as above, and the disazo dyestuffs of formula

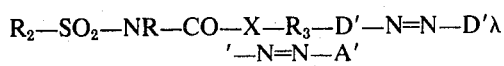

wherein R, $R_2$, $R_3$, D' and A' have the same significance as above and D'' is a p-phenylene residue.

Referred dyestuffs have the formula $D-N=N-Py-(C_1-C_4-$alkylene or phenylene$)-X-CO-NR-SO_2-R_2$ wherein D is the residue of a diazo component of the benzene series, X is $-O-$ or $-NR_1-$ wherein $R_1$ is hydrogen or $C_1-C_4$-alkyl, $R_2$ is $C_6-C_{10}$-aryl and Py is a pyrazole residue bound in 1-position and in 4-position, the latter to the azo bridge.

Particularly valuable are the dyestuffs of the formula

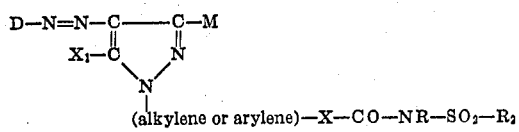

wherein M is $C_1-C_3$-alkyl, phenyl
  $-CO-O(C_1-C_4$-alkyl or phenyl),
  $-CO-NH_2$(optionally $C_1-C_4$-alkylated,
  and $X_1$ is $-NH_2$ or OH.

Styryl dyestuffs

Preferred styryl dyestuffs are those of formula

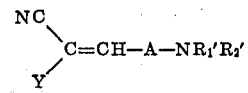

wherein A, $R_1'$ and $R_2'$ have the same significance as above and Y is a nitrile, carbalkoxy or arylsulphonyl group, such as for example a carbethoxy or phenylsulphonyl group.

Particularly interesting dyestuffs are those of formula

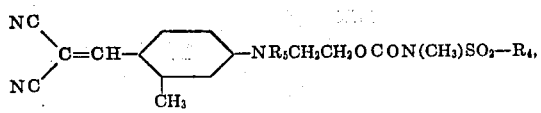

wherein $R_4$ is an alkyl group or preferably an aromatic group such as a phenyl group and $R_5$ is an alkyl, or aralkyl group or the residue of formula —CH$_2$CH$_2$OCON—(CH$_3$)SO$_2$R$_4$.

Preferred bis-styryl dyestuffs are those of formula

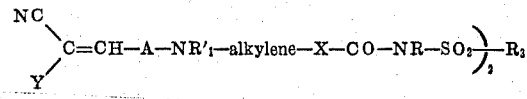

wherein R, R$_1'$, R$_3$, A, X and Y have the same significance as above.

Anthraquinoid dyestuffs

Dyestuffs according to the invention of the anthraquinone series are for example anthraquinone derivatives of formula $$A \pm X—CO—NR—SO_2—R_2]_n$$

wherein n is an integer from 1 to 4, preferably 1, X, R and R$_2$ have the same significance as above and A denotes an anthraquinone residue having three or four condensed rings, which contain one or more other substituents such as for example halogen atoms such as fluorine, chlorine or bromine, hydroxyl groups, alkoxy groups, amino groups, acylamino groups, alkylamino groups having one to three carbon atoms, acyloxy groups, optionally substituted aryl residues, optionally substituted heterocyclic residues, arylamino groups, wherein the aryl residue is preferably a phenyl group which may be substituted by one or more halogen atoms, alkyl or alkoxy groups, alkylsulphonyl or optionally substituted phenylsulphonyl groups, alkylthioether or optionally substituted phenylthioether residues as well as nitro, nitrile, carboxylic acid ester and acetyl groups. Examples of tetracyclic anthraquinone residues are 1,9-isothiazolanthrone, 1,9-anthrapyrimidine or 1,9-pyrazolanthrone. The alkyl residues are preferably lower alkyl residues which can contain up to six carbon atoms.

Preferred anthraquinone dyestuffs are for example those of formula

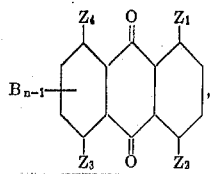

wherein B denotes a halogen atom, especially a bromine or chlorine atom, or an alkyl or alkoxy group, especially methyl or methoxy, n = 1 or 2 and Z$_1$, Z$_2$, Z$_3$ and Z$_4$ each denote a hydrogen atom, an amino or hydroxyl group which is optionally substituted by an alkyl, aralkyl, cycloalkyl, aryl or heterocyclic residue, or an amino or hydroxyl group substituted by an organic acid residue, with at least one of the symbols Z$_1$, Z$_2$, Z$_3$ or Z$_4$ containing or denoting a group of formula —X—CO—NR—SO$_2$—R$_2$, such as for example a group of formula —NH—C$_6$H$_4$—NH—CO—NH—SO$_2$—R$_2$ or —N(CH$_3$)—CO—N(CH$_3$)—SO$_2$—R$_2$, wherein R$_2$ has the same significance as given above.

Other preferred anthraquinone dyestuffs are for example those of formula

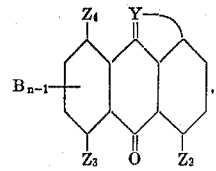

wherein Z$_2$, Z$_3$, Z$_4$, B and n have the same significance as above and Y is a residue of formulae =N—NH—, =N—NR$_1'$—, =N—CO—NR$_1'$—, =CH—CO—NR$_1'$— or =N—S—, wherein R$_1'$ has the same significance as above, but is preferably a methyl group.

Further preferred anthraquinone dyestuffs are for example those of formula

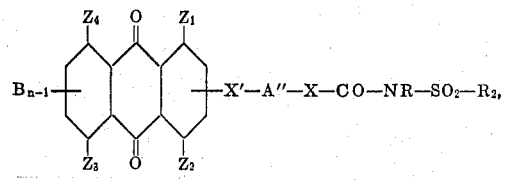

wherein Z$_1$, Z$_2$, Z$_3$, Z$_4$, B, n, X, R and R$_2$ have the same significance as above, A″ is an aliphatic, araliphatic, aromatic or heterocyclic residue which is optionally interrupted or substituted by hetero-atoms, and X′ is a direct bond, a sulphonyl, sulphonyloxy or sulphonylamino group or has the same significance as given for X. Amongst these dyestuffs, the subgroup wherein the symbol X′ is a direct bond, the symbol Hal is a chlorine or bromine atom, the group X is an oxygen atom and the group R is a lower alkyl residue or a hydrogen atom, and the group A″ is a p-phenylene residue which can furthermore carry alkoxy, hydroxyl, phenoxy or acyloxy groups is particularly of interest.

The new dyestuffs are manufactured (a) by reacting a dyestuff which contains at least one group of formula —XH, wherein X has the same significance as above, with at least one sulphonylisocyanate which contains at least one group of formula —SO$_2$—N=C=O or (b) by linking two components of which at least one component contains at least one group of formula —X—CO—NR—SO$_2$— by condensation or coupling to give a dyestuff which contains at least one group of formula —X—CO—NR—SO$_2$—, or (c) by acylation or preferably N—C condensation (with the formation of a N—C bond) of a compound possessing dyestuff character which contains at least one of the groups of formulae —X—CO—NHSO$_2$— or —NH—CO—NR$_1$SO$_2$— with a compound which is preferably an alkylating compound.

Stage (c) serves to introduce the groups R and/or R$_1$.

I. Process variant (a)

A. Sulphonylisocyanates

Possible sulphonylisocyanates for embodiment (a) are optionally substituted aliphatic, cycloaliphatic, araliphatic, aromatic and heterocyclic sulphonylisocyanates such as for example methyl-sulphonylisocyanate, ethyl-sulphonylisocyanate, isopropyl-1-sulphonylisocyanate, n-propyl-1-sulphonylisocyanate, n-butyl-1-sulphonylisocyanate, propen-1-yl-sulphonylisocyanate, n-hexen-1-yl-sulphonylisocyanate, 4,4-dichlorobuten-1-yl-sulphonylisocyanate, 2-chlorovinyl-sulphonylisocyanate, cyclohexyl-1-sulphonylisocyanate, cyclohexen-1-yl-sulphonylisocyanate, 2-chlorethyl-sulphonylisocyanate, 2-chloropropyl-sulphonylisocyanate, 2-chlorohexylsulphonylisocyanate, 2-methyl-2-chloropropyl-sulphonylisocyanate, 2-vinyl-sulphonylisocyanate, phenyl-sulphonylisocyanate, 4-tolyl-sulphonylisocyanate, 4-chlorophenyl-sulphonylisocyanate, 4-fluorophenyl-sulphonylisocyanate, 4-bromophenyl-sulphonylisocyanate, 4-methoxyphenyl-sulphonylisocyanate, 2,5-dimethyl-phenyl-sulphonylisocyanate, 3-nitrophenyl-sulphonylisocyanate, 4-nitrophenyl-sulphonylisocyanate, 2-methylphenylene-1,4-bis(sulphonylisocyanate), n-butylene-1,4-bis-(sulphonylisocyanate), n-hexylene-1,6-bis(sulphonylisocyanate), phenylene-1,3-bis-(sulphonylisocyanate), naphthalene-1,5-bis-(sulphonylisocyanate), benzthiazolyl-2-sulphonylisocyanate, thienyl-2-sulphonylisocyanate and the sulphonyldiisocyanate of formula $SO_2(NCO)_2$.

The general manufacture of the sulphonylisocyanate is described by Henri Ulrich, *Chemical Reviews*, 1965, pages 369 – 371 and by Henri Ulrich and A. A. R. Sayigh, *Zeitschrift fur angewandte Chemie*, 1966, pages 761 – 769.

The sulphonylisocyanates are particularly conveniently manufactured by phosgenation of sulphonamides such as for example of methanesulphonamide, ethanesulphonamide, 1-butanesulphonamide, 1,3-propanedisulphonamide, 1-propanesulphonamide, ethylenemonosulphonamide, α-toluenesulphonamide, phenethylsulphonamide, benzenesulphonamide, o-toluenesulphonamide, p-toluenesulphonamide, p-acetylamino-benzenesulphonamide, 4-bromobenzenesulphonamide, 2-methoxy-4-methyl-5-bromobenzenesulphonamide, 1-naphthalenesulphonamide, 2-naphthalenesulphonamide, 3-pyridinesulphonamide, 6-quinolinesulphonamide, 2-imidazolsulphonamide, 2-benzimidazolesulphonamide, 1,2,4-triazole-3-sulphonamide, 2-thiazolesulphonamide, 2-benzthiazolesulphonamide, 2-pyrimidinesulphonamide, 2-pyrazinesulphonamide, 2-nitrofuranesulphonamide and 2-acetylamino-1,3,4-thiadiazole-5-sulphonamide.

B. Dyestuff components

The following dyestuffs are for example suitable for use as reactive components which are reacted with the sulphonylisocyanates mentioned in accordance with the invention:

1. Azo dyestuffs

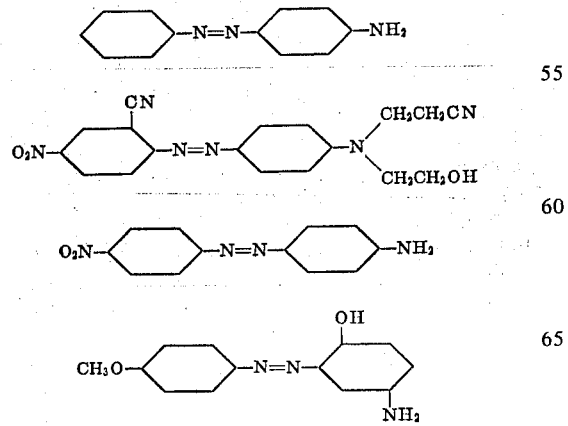

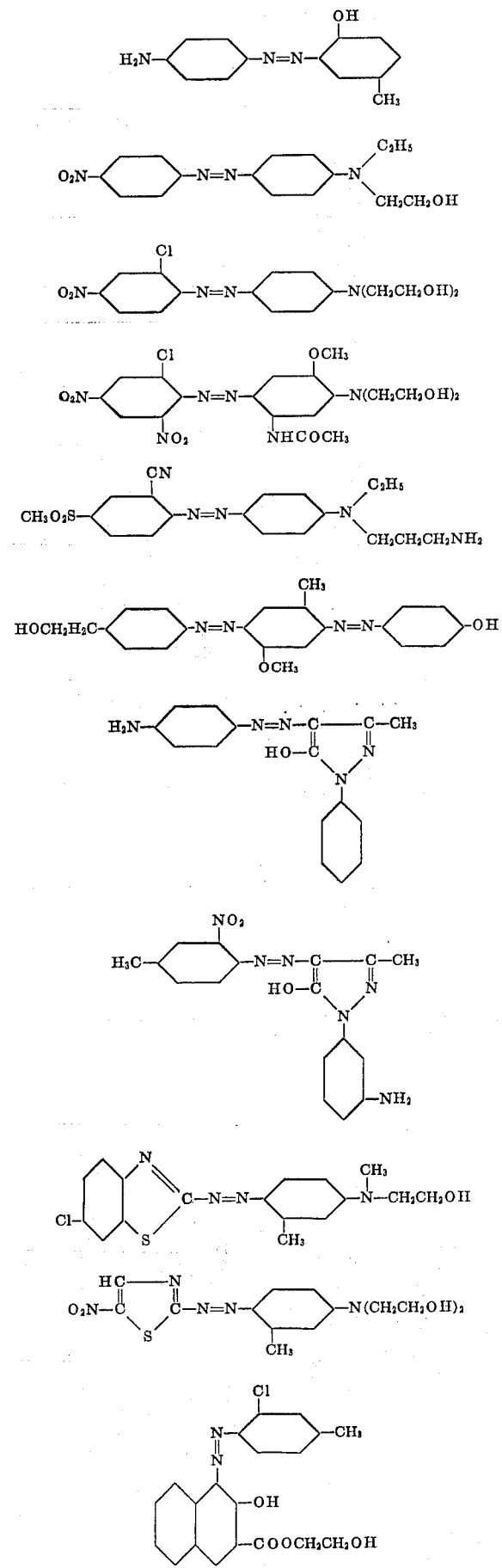

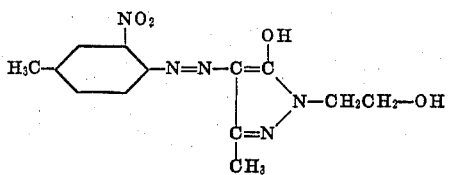

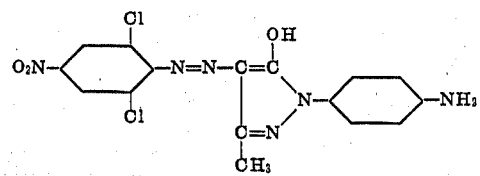

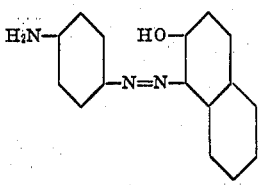

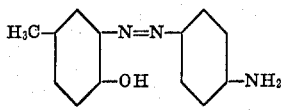

2. Anthraquinone dyestuffs 1-aminoanthraquinone, 2-aminoanthraquinone, 1-amino-5-chloro-8-hydroxyanthraquinone, 1-amino-2-bromanthraquinone, 1-amino-5-hydroxy-6,8-dichloranthraquinone, 1-amino-5,8-dichloranthraquinone, 1-amino-5-nitroanthraquinone, 1-amino-5-chloro-8-methoxyanthraquinone, 1-amino-7-chloranthraquinone, 1-amino-6-chloranthraquinone, 1-amino-6- or -7-fluoranthraquinone, 1-amino-6- or -7-bromanthraquinone, 1-amino-6,7-dichloranthraquinone, 1-amino-6,7-difluoranthraquinone, 1-amino-2-($\beta$-hydroxyethyloxy)-4-hydroxyanthraquinone, 1-amino-2-bromanthraquinone, 1-amino-2-methylanthraquinone, 1-($\beta$-aminoethylamino)-4-acetylaminoanthraquinone, 1-($\beta$-aminoethylamino)-anthraquinone, 1-acetylamino-4-hydroxyanthraquinone, 1-amino-4-hydroxyanthraquinone, 1-amino-4-chloranthraquinone, 1-amino-4-guanidinoanthraquinone, 1-amino-4-($\beta$-hydroxyethylamino)-anthraquinone, 1-amino-2,4-dibromanthraquinone, 1-(2-hydroxyethylamino)-anthraquinone, 1-amino-2-isopropylmercaptoanthraquinone, 1-amino-2-methoxy-4-hydroxyanthraquinone, 1,2-diaminoanthraquinone, 1-hydroxyanthraquinone, 2-hydroxyanthraquinone, 1,2-dihydroxyanthraquinone, 1,4-dihydroxyanthraquinone, 1,8-dihydroxyanthraquinone, 1,2,4-trihydroxyanthraquinone, 2,6-dihydroxyanthraquinone, 1,2,5,8-tetrahydroxyanthraquinone, 1,2,4,5,6,8-hexahydroxyanthraquinone, 1-hydroxy-4-acetylaminoanthraquinone, 1,4-diaminoanthraquinone, 1,4-diamino-2-cyananthraquinone, 1,4-diamino-2-methoxyanthraquinone, 1,4-diamino-2-carbamoylanthraquinone, 1,4-diamino-5-nitroanthraquinone, 1,4-diamino-2,3-dimethoxyanthraquinone, 1,4-diamino-2,3-dicyananthraquinone, 1,4-bis-(p-amino-anilino)-5-hydroxyanthraquinone, 1,4-bis-(p-amino-anilino)-5,8-dihydroxyanthraquinone, 1,4-bis-(p-amino-anilino)-anthraquinone, 1,5-bis-(p-amino-anilino)-2-methyl-anthraquinone, 1,5-bis-(p-aminoanilino)-4,8-dihydroxyanthraquinone, 1,-5-bis-(p-aminoanilino)-2-($\beta$-hydroxyethylmercapto)-anthraquinone, 1,5-bis-($\beta$-hydroxyethylamino)-anthraquinone, 1,4-dihydroxy-2-($\beta'$-hydroxyethyl-$\beta$-oxyethyl)-anthraquinone, 1,4-dihydroxy-2-($\beta'$-hydroxyethyl-$\beta$-mercaptoethyl)-anthraquinone, 1,4-dihydroxy-2-($\beta''$-hydroxyethyl-$\beta'$-oxyethyl-$\beta$-oxyethyl)-anthraquinone, 1,6-diaminoanthraquinone, 1,8-diaminoanthraquinone, 1,8-diamino-2-methylanthraquinone, 1,8-bismethylaminoanthraquinone, 1-methylamino-2-isopropylmercaptoanthraquinone, 1-methylamino-4-butylaminoanthraquinone, 1-anilino-2-chlor-4-aminoanthraquinone, 1-methylamino-4-(p-amino-anilino)-anthraquinone, 1-methylaminoanthraquinone, 1,4,5-triaminoanthraquinone, 1,4,5-trihydroxyanthraquinone, 1,4,5,8-tetraaminoanthraquinone, 1,4,5,8-tetrahydroxyanthraquinone, 1-(amino- or hydroxy)-4-(methoxy, ethoxy, propoxy, i-butoxy or cyclohexyloxy)-anthraquinone, 1-(amino or hydroxy)-4- or -5-[2', 3' or 4'-(chloro, fluoro, bromo, methyl, methoxy, $\beta$-methoxyethyl, cyano or trifluoromethyl)-phenylamino]-anthraquinone, 1-(amino or hydroxy)-4- or -5-[2', 3' or 4'-(chloro, fluoro, bromo, methyl, methoxy, or ethyl)-benzoylamino]-anthraquinone, 1-(amino or hydroxy)-4- or -5-(methyl, ethyl, n- or iso-propyl, n-, iso or tertiary-butyl, $\beta$-methoxyethyl, $\beta$-cyanethyl or chloromethyl)-carbonylaminoanthraquinone, 1-(amino or hydroxy)-4- or -5-(methyl, ethyl, propyl, $\beta$-methoxyethyl or $\beta$-cyanethyl)-aminoanthraquinone, 1,5-diamino-4,8-dihydroxy-2-($\beta$-hydroxyethylmercapto)-anthraquinone, 1-amino-4-cyclohexylamino-2-anthraquinonecarboxamide, 1,4-diamino-2,3-anthraquinonedicarboximide, 1-hydroxy-4-amino-2,3-anthraquinonedicarboximide, 1,4-diaminoanthraquinone-2,3-dicarboxylic acid-$\beta$-hydroxyethylimide, 5-amino-1,9-isothiazoleanthrone, 4-amino-1,9-anthrapyrimidine, 5-amino-1,9-anthrapyrimidine and 2- or 3-aminobenzanthrone.

Representatives of the 2- or 3-phenyl-anthraquinone substituted in the 1,4,5,8-position are 1,5-dihydroxy-4,8-diamino-2- or -3-(3'-methoxy-4'-hydroxyphenyl)-anthraquinone; 1,5-dihydroxy-4,8-diamino-2- or -3-(4'-hydroxyphenyl)-anthraquinone, 1,5-dihydroxy-4,8-diamino-2- or -3-(4'-hydroxy-2'-methylphenyl)-anthraquinone, 1,5-dihydroxy-4,8-diamino-2- or -3-(4'-hydroxyphenyl)-6- or -7-bromanthraquinone, 1,5-dihydroxy-4,8-diamino-2- or -3-(4'-hydroxy-3'- or 2'-bromophenyl)anthraquinone and 1,5-dihydroxy-4-amino-8-acetoxyethylamino-2- or -3-(4'-hydroxyphenyl)-anthraquinone.

3. Nitro dyestuffs

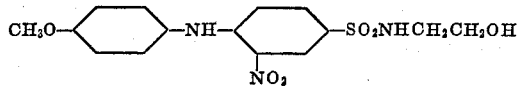

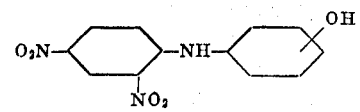

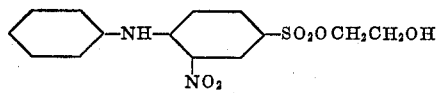

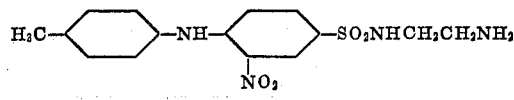

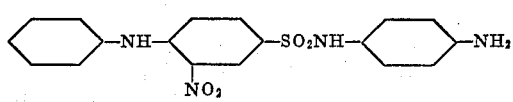

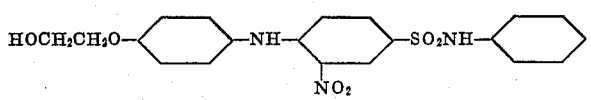

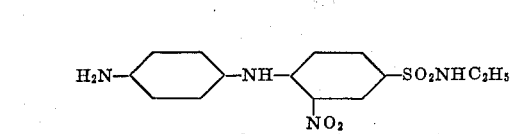

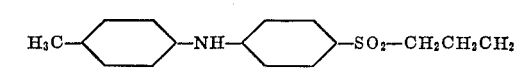

4-Sulphamido-2-nitrodiphenylamino-2'-,3'- or -4'-carboxylic acid β-hydroxyethyl ester and 4'-phenylazo-2-nitro-diphenylamine-4-sulphonic acid N-β-hydroxyethylamide.

4. Styryl dyestuffs

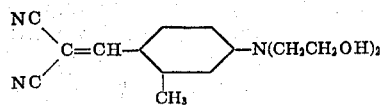

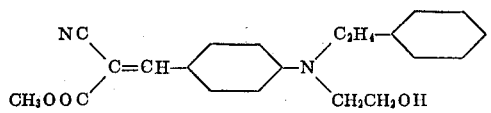

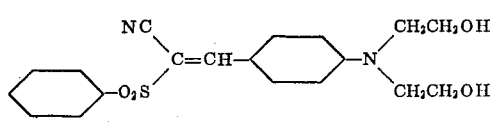

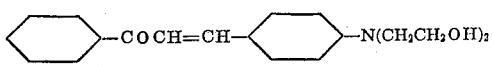

5. Perinone dyestuffs

Mixtures of the dyestuffs of formula

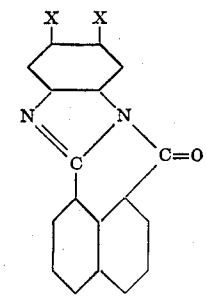

or mixtures of the dyestuffs of formula

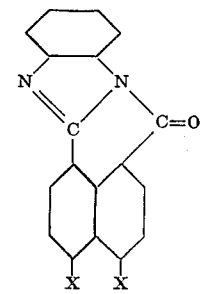

wherein, in each case, one X represents a group of formula —NH₂ and one X represents a hydrogen atom.

C. Reaction conditions

The sulphonylisocyanates are, because of their high reactivity, employed in the form of solutions in aqueous inert organic solvents such as methylene chloride, chloroform, carbon tetrachloride, benzene, chlorinated benzenes, chlorinated higher aromatic hydrocarbons, diethylene, diisopropyl ether, dioxane and acetonitrile. The reaction may take place at room temperature or at higher temperatures. Normally the solution of the sulphonylisocyanate is added slowly to the dyestuff which is to be reacted or to the dyestuff component which is to be reacted. The other conditions for a selective reaction, such as low temperature, optionally below room temperature, and the use of dilute solutions of the reagents, are also observed. If necessary, reactive groups which are present such as hydroxyl or amino groups are protected with suitable protective groups, for example acyl residues, optionally in the presence of catalysts, for example pyridine.

II. Process variant (b)

A. Azo dyestuffs (coupling)

The azo dyestuffs according to the invention can also be obtained by coupling a diazonium compound of an amine with a coupling component, with at least one of the components having to contain a group of formula $-X-CO-NR-SO_2-R_2$.

1. Diazo components

Suitable diazo components which contain the group of formula $-X-CO-NR-SO_2-R_2$ are obtained by reaction of an aromatic or heterocyclic nitro compound which possesses at least one group of formula $-XH$, such as for example 2-hydroxy-4-methylsulphonyl-nitrobenzene, 4-hydroxy-2-methylsulphonyl-nitrobenzene or 2,6-dichloro-4-hydroxy-nitrobenzene with a sulphonylisocyanate, an optionally occurring alkylation of the imino group, and subsequent reduction of the nitro group.

As diazo components without groups of formula $-X-CO-NR-SO_2$ it is possible to use the above-mentioned diazo components of formula $D-NH_2$, to the extent that these are not derived from a sulphonylisocyanate.

2. Coupling components

Suitable coupling components which contain a group of formula $-X-CO-NR-SO_2$ are obtained by reaction of one of the components given below with a sulphonylisocyanate and optional subsequent alkylation: N-β-hydroxyethyl-N-ethylaniline, N-β-hydroxyethyl-N-cyanethylaniline, N,N-bis-β-hydroxyethylaniline, 3-acetamino-6-methoxy-N,N-bis-β-hydroxyethylaniline, 3-amino-N,N-bis-β,β-acetoxyethylaniline, 3-amino-N,N-bis-β,β-cyanethylaniline, 1-β-hydroxyethyl-3-methylpyrazolone-(5), and the β-hydroxyethylamide of 8-hydroxynaphthalene-5- or -6-sulphonic acid.

As coupling components without groups of formula $-X-CO-NR-SO_2-$, the following may for example be mentioned: N,β-cyanethyl-N-methyl-aminobenzene, N,N-di-β-hydroxyethylaminobenzene, 1-N-β-cyanethyl-N-ethylamino-3-methylbenzene, 3-cyano-2,6-dihydroxy-4-methylpyridine, 1-N-β-cyanethylamino-3-methylbenzene, 1-N,N-di-β-hydroxyethyl-amino-3-thiocyanatobenzene, N-β-cyanethyl-naphthasultam-(1,8), 1-N,N-di-β-cyanethyl-3-methyl-aminobenzene, N,β-cyanethyl-N,β-hydroxyethyl-aminobenzene, N,β-cyanethyl-2-methyl-indole, N,β-cyanethyl-tetrahydroquinoline, N-phenyl-aminobenzene, 4-hydroxy-1-methylquinolone-(2), 1-hydroxy-4-methylbenzene, 2-hydroxy-3-naphthol-acid-o-anisidide, 8-hydroxyquinoline, 2-naphthylamine-5-sulphomethylamide, 1,3-dihydroxybenzene, 1-hydroxy-3-cyanomethylbenzene, 1-phenyl-3-methyl-5-pyrazolone and acetoacetic ester.

3. Diazotisation and Coupling

The diazotisation of the diazo components mentioned can take place according to methods which are in themselves known, for example with the aid of a mineral acid and sodium nitrite or for example with a solution of nitrosylsulphuric acid in concentrated sulphuric acid.

The coupling can also be carried out in a manner which is in itself known, for example in a neutral to acid medium, optionally in the presence of sodium acetate or similar buffer substances which influence the coupling speed, or of catalysts such as for example dimethylformamide, pyridine or their salts.

The coupling also takes place advantageously if the components are combined by means of a mixing nozzle. This is to be understood as a device in which the liquids to be mixed are combined with one another in a relatively small space, with at least one liquid being passed through a nozzle, preferably at an elevated pressure. The mixing nozzle can for example be constructed, and can operate, according to the principle of water-jet pump, with the feed of one liquid into the mixing nozzle corresponding to the feed of water into the waterpump and the feed of the other liquid into the mixing nozzle corresponding to the connection of the water-jet pump to the vessel which is to be evacuated, with this latter liquid feed also being allowed to take place at elevated pressure.

Other suitable devices can however also serve for rapid optionally continuous mixing in a small space.

After the coupling reaction has taken place the resulting non-quaternised dyestuffs can easily be separated from the coupling mixture, for example by filtration, since they are practically insoluble in water. If the resulting dyestuffs are quaternised, they are salted out.

B. Styryl dyestuffs (condensation)

In order to manufacture the styryl dyestuffs according to the invention, for example an aldehyde of formula

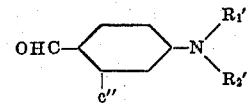

wherein c" represents a hydrogen atom or preferably a methyl group and $R_1''$ and $R_2''$ have the significance given above, can be condensed with a nitrile compound of formula

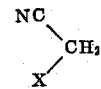

with the application of heat in the presence of a basic catalyst such as for example ammonia, dimethylamine, diethylamine, piperidine, piperidine acetate, sodium alcoholate or potassium alcoholate, optionally in the presence of a solvent such as methanol, ethanol, benzene, toluene, xylene, chloroform or carbon tetrachloride. Suitable nitrile compounds of formula $NC-CH_2-X$ for the reaction of the styryl dyestuff are for example: malonic acid dinitile, cyanacetic acid methyl ester, cyanacetic acid ethyl ester, cyanacetic acid butyl ester, cyanacetamide, cyanacetmethylamide, cyanacetdimethylamide, methylsulphonylacetonitrile and phenylsulphonylacetonitrile.

When using solvents the water produced in the reaction can be continuously removed from the reaction mixture by azeotropic distillaton of these solvents, as a result of which the reaction equilibrium is constantly displaced in favour of the condensation product. The condensation can also take place without a basic catalyst in glacial acetic acid or some other organic acid or in the presence of a solvent by fusing the reagents together in the presence of a basic catalyst, for example ammonium acetate or piperidine acetate.

Anilines which are suitable as starting products are for example obtained by reacting as sulphonylisocyanate with for example 3-methyl-N,N-bis-β-hydroxyethyl-aniline, 3-methyl-N-benzyl-N-β-hydroxyethyl-amidine, 3-methyl-N-phenoxyethyl-N-β-hydroxyethyl-aniline, 3-methyl-N-β-acetoxyethyl-N-β-hydroxyethyl-aniline, 3-methyl-N-ethyl-N-β-hydroxyethyl-aniline or 7-methyl-N-β-hydroxyethyl-quinoline.

C. Nitro dyestuffs (condensation)

In order to manufacture ditro dyestuffs, a sulphonylisocyanate of formula

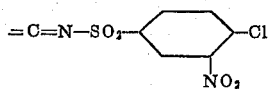

(manufactured by phosgenation of the sulphonamide of formula

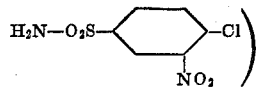

can be condensed with two equivalents of an aniline which is optionally substituted at the aromatic nucleus.

The imino groups of the residues $-O-CO-NH-SO_2-$, $-NH-CO-NH-SO_2-$, $-S-CO-NH-SO_2-$, $-NR_1-CO-NH-SO_2-$ and $-NH-CO-NR-SO_2-$ is effected by adding alkylating agents such as for example dimethylsulphate, diethylsulphate, methyl chloride, ethyl bromide, methanesulphonic acid methyl ester or the methyl or ethyl esters of 4-methyl-, 4-chloro-, or 4-nitro-benzenesulphonic acid in suitable organic solvents such as for example xylene, carbon tetrachloride, o-dichloro-benzene, nitrobenzene, dimethylformamide, dimethylsulphoxide, acetonitrile or dioxane, optionally with warming.

Further variants of the manufacturing process of sulphonylurethanes according to the invention.

1. Reaction of chlorocarbonic acid esters with alkali salts of sulphonamides or with the free sulphonamides in the presence of alkali carbonate, with at least one of the two organic components having to possess dyestuff character.

2. Reaction of the alkali or alkaline earth salts of sulphonamides which possess dyestuff character with pyrocarbonic acid esters in solution or in suspension up to temperatures of 90°C and isolation of the free sulphonylurethanes from the resulting sulphonylurethane salts. 3. Decomposition of sulphonylureas with alcohols possessing dyestuff character.

4. Reaction of sulphochlorides with urethanes, with the sulphochlorides an/or the urethanes possessing dyestuff character.

Quaternisation

If the dyestuffs obtained according to the process of the invention and its variants contain quaternisable nitrogen atoms then these can be quaternised subsequent to the manufacture of the dyestuffs. Suitable quaternisable groups are for example those of formulae

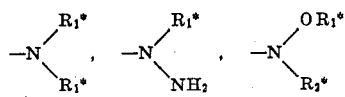

and $$-CONH-NR_1^=NR_2^=,$$

wherein $R_1^=$ and $R_2^=$ are alkyl residues which together can form a chain which is optionally interrupted by hetero-atoms, and the group of formula

as well as other heterocyclic structures which can be quaternised to cyclammonium groups, such as for example the residues of the above-mentioned heterocyclic diazo components of formula $D-NH_2$.

The quaternisation is effected by treatment with esters of strong mineral acids or organic sulphonic acids such as for example dimethylsulphate, diethylsulphate, alkyl halides, such as methyl chloride, methyl bromide or methyl iodide, aralkyl halides, such as benzyl chloride, esters of low molecular alkanesulphonic acids, such as for example the methyl ester of methanesulphonic, ethanesulphonic or butanesulphonic acid and the alkyl esters of (4-methyl-, 4-chloro-or 3- or 4-nitro-)benzenesulphonic acid, which form halogen, sulphuric acid half-ester, alkanesulphonic or benzenesulphonic acid anions as anions, preferably whilst warming in inert organic solvents, for example xylene, carbon tetrachloride, o-dichlorobenzene and nitrobenzene. It is however also possible to use solvents such as acetic anhydride, dimethylformamide, acetonitrile or dimethylsulphoxide. The quaternised dyestuffs preferably contain, as the anion $Y^-$, the residue of a strong acid such as sulphuric acid or its half-esters, or a halide ion, but can also be used as double salts, for example with zinc chloride, or as free bases.

The quaternised dyestuffs for example correspond to the general formulae

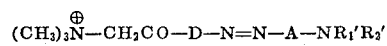
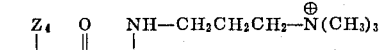
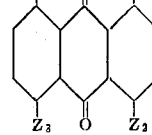
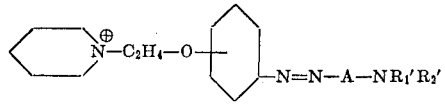

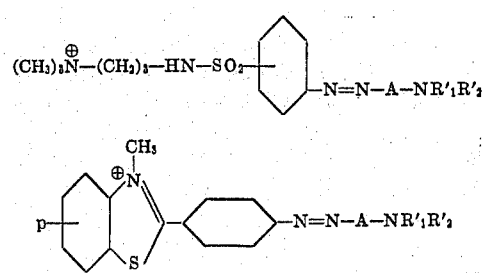

wherein p is a hydrogen atom, a $C_1$-$C_2$ alkyl group or a negative substituent, and D', A, $R_1''$, $R_2''$, $Z_2$, $Z_3$ and $Z_4$ have the same significance as above.

III. Use

The dyestuffs described above as a rule contain no acid groups which confer solubility in water, especially no sulphonic acid groups, and are therefore sparingly soluble or insoluble in water. If they contain quaternised nitrogen atoms they are on the other hand soluble in water.

The water-insoluble dyestuffs, their mixtures with one another and their mixtures with other azo dyestuffs are, especially after conversion to a finely divided form, for example by grinding, conversion to pastes, reprecipitation etc., excellently suited to the dyeing and printing of synthetic fibres such as for example acrylic or acrylonitrile fibres, polyacrylonitrile fibres and copolymers of acrylonitrile and other vinyl compounds such as acrylic esters, acrylamides, vinylpyridine, vinyl chloride or vinylidene chloride, copolymers of dicyanethylene and vinyl acetate, as well as fibres of acrylonitrile block copolymers, fibres of polyurethanes, polyolefines, cellulose triacetate and 2½-acetate, polyamides, such as nylon 6, nylon 6,6 or nylon 12, and especially fibres of aromatic polyesters such as those obtained from therephthalic acid and ethylene glycol or 1,4-dimethylolcyclohexane, and copolymers of terephthalic and isophthalic acid and ethylene glycol.

The subject of the present invention is therefore also a process for the dyeing or printing of synthetic fibres, especially of polyester fibres, which is characterised in that dyestuffs which are free of carboxyl and sulphonic acid groups, which contain at least one group of formula —X—CO—NR—$SO_2$—, wherein R is an acyl group or preferably a hydrogen atom or an optionally substituted alkyl, cycloalkyl, aryl or heterocylcic group and X is an oxygen or sulphur atom or a group of formula —$NR_1$—, wherein $R_1$ is an acyl group or preferably a hydrogen atom or an optionally substituted alkyl, cycloalkyl, aryl or heterocyclic group, their mixtures with one another or their mixtures with other dyestuffs are used.

Preferably, azo dyestuffs, especially monoazo dyestuffs and disazo dyestuffs, anthraquinones, perinones, styryl dyestuffs and nitro dyestuffs are used.

Amongst the types of fibres, the group of fibres containing ester groups, and above all the polyester fibres, deserve particular emphasis.

For dyeing, the water-insoluble non-quaternised dyestuffs are appropriately used in a finely divided form and dyeing is effected with the addition of dispersing agents such as sulphite cellulose waste lye or synthetic detergents, or a combination of various wetting and dispersing agents. As a rule it is appropriate to convert the dyestuffs to be used, before dyeing, into a dyeing preparation which contains a dispersing agent and finely divided dyestuff in such a form that on dilution of the dyestuff preparations with water a fire dispersion is produced. Such dyestuff preparations can be obtained in a known manner, for example by grinding the dyestuff in a dry or wet form with or without the addition of dispersing agents during the grinding process. The above-mentioned synthetic fibres can also be dyed in organic solvents in which the dyestuff is present as a solution.

In order to achieve intense dyeings on polyethylene terephthalate fibres it proves appropriate to add a swelling agent to the dyeing bath or to carry out the dyeing process under pressure at temperatures above 100°C, for example at 120°C. Suitable swelling agents are aromatic carboxylic acids, for example benzoic acid or salicylic acid, phenols such as for example o- or p-hydroxydiphenyl, salicylic acid methyl ester, aromatic halogen compounds such as for example chlorobenzene, o-dichlorobenzene or trichlorobenzene, phenylmethylcarbinol or diphenyl. When dyeing under pressure it proves advantageous to render the dyeing bath weakly acid, for example by adding a weak acid, for example acetic acid.

The non-quaternised water-insoluble dyestuffs to be used in accordance with the invention prove to be particularly suitable for dyeing according to the so-called thermofixing process, according to which the fabric to be dyed is impregnated with an aqueous dispersion of the dyestuff which appropriately contains 1 to 50 percent of urea and a thickener, especially sodium alginate, preferably at temperatures of at most 60°C, and is squeezed out in the usual manner. It is appropriate to squeee out in such a way that the impregnated goods retain 50 to 100 percent of their starting weight of dyeing liquor.

In order to fix the dyestuff, the fabric impregnated in this way is, appropriately after a prior drying, for example in a warm stream of air, heated to temperatures of above 100°C, for example between 180 and 210°C.

The thermofixing process which has just been mentioned is of particular interest for dyeing mixed fabrics of polyester fibres and cellulose fibres, especially cotton. In this case the padding liquor contains, in additin to the non-quaternised water-insoluble dyestuff to be used according to the invention, also dyestuffs which are suitable for dyeing cotton, for example direct dyestuffs or vat dyestuffs, or especially so-called reactive dyestuffs, that is to say dyestuffs which can be fixed to the cellulose fibre with the formation of a chemical bond, that is to say for example dyestuffs containing a chlorotriazine or chlorodiazine residue. In the latter case it proves appropriate to add an acid-binding agent, for example an alkali carbonate or alkali phosphate, alkali borate or alkali perborate or their mixtures to the padding solution. When using vat dyestuffs it is necessary for the padded fabric after heat treatment to be treated with an aqueous alkaline solution of a reducing agent which is usual in vat dyeing.

The dyeings on polyester fibres obtained according to the present process are appropriately subjected to a posttreatment, for example by heating with an aqueous solution of a non-ionic detergent.

Instead of being applied by impregnation, the dyestuffs specified can, according to the present process, also be applied by printing. For this purpose a printing ink is for example used which in addition to the auxiliary substances usual in printing, such as wetting agents and thickeners, contain the finely dispersed dyestuff optionally mixed with one of the above-mentioned cotton dyestuffs, optionally in the presence of urea and/or an acid-binding reagent.

Using the present process, intense dyeings and prints of excellent fastness properties, especially good fastness to light, sublimation, decatising, washing and chlorine water are obtained. The dyeings on acetate rayon are furthermore distinguished by good gas fastness. A further advantage resides in the good wool and cotton reserve of the dyestuffs to be used in accordance with the process.

The new water-insoluble non-quaternised dyestuffs can also be used for the spin dyeing of polyamides, polyesters and polyolefines. The polymer to be dyed is appropriately mixed, in the form of powders, granules or chips, as a finished spinning solution or in the fused state, with the dyestuff which is introduced in the dry state or in the form of a dispersion or solution in a solvent which may be volatile. After homogeneous distribution of the dyestuff in the solution or melt of the polymer the mixture is processed in a known manner by casting, pressing or extrusion to give fibres, yarns, monofilaments, films and the like.

The new water-soluble quaternised dyestuffs or dyestuff salts are suitable for dyeing and printing the most diverse fully synthetic fibres such as for example polyvinyl chloride, polyamide, polyurethane and especially polyacrylic fibres.

The new dyestuffs are furthermore also suitable for the bulk colouring of polymerisation products of acrylonitrile, of polyolefines and also of other plastic compositions, and are also suitable for the colouring of oil paints and lacquers. It is also possible to use the above-mentioned thermofixing process.

The new water-insoluble non-quaternised dyestuffs in part also represent valuable pigments which can be used for the most diverse pigment applications, for example in a finely divided form for dyeing rayon and viscose or cellulose ethers and esters, for the manufacture of inks, especially of ball pen inks, as well as for the manufacture of coloured lacquers or lacquer-forming substances, solutions and products made of acetylcellulose, nitrocellulose, natural resins or synthetic resins, such as polymerisation resins or condensation resins, for example aminoplasts, alkyd resins, phenoplasts, polyolefines such as polystyrene, polyvinyl chloride, polyethylene, polypropylene, polyacrylonitrile, rubber, casein, silicone and silicone resins.

The dyestuffs which are fully methylated at the sulphonylurea or methane group are particularly suitable for dyeing polyolefine fibres such as polypropylene fibres from an aqueous or organic liquor, above all by the padding-thermo-fixing process.

In the examples which follow the arts, unless otherwise specified, denote parts by weight and the percentages denote percentages by weight.

EXAMPLE 1

2.55 parts of 4-[N-ethyl-N-β-hydroxyethyl-amino]-2-methylbenzylidenemalodinitrile, 2.2 parts of p-toluenesulphonylisocyanate and 20 parts by volume of chlorobenzene are heated for 2½ hours under reflux. The solvent is distilled off under reduced pressure and the residue is triturated with methanol. The precipitated orange-yellow dyestuff of formula

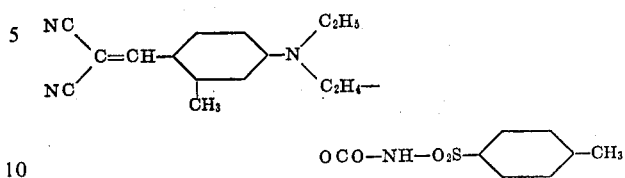

is filtered off, washed with methanol and dried. It dyes polyester fibres from boiling tetrachlorethylene to give greenish-tinged yellow shades.

EXAMPLE 2

4 parts of 4-[N,N-bis-(2'-hydroxyethyl)-amino]-2-methylbenzylidenemalodinitrile are dissolved in 100 parts by volume of hot chlorobenzene and a solution of 6.6 parts of p-toluenesulphonylisocyanate in 100 parts by volume of chlorobenzene is added dropwise. The mixture is allowed to stand overnight at room temperature. The precipitated dyestuff of formula

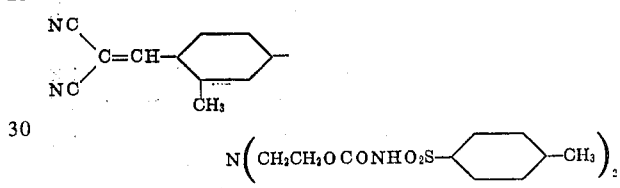

is filtered off, rinsed with a little chlorobenzene and dried. It dyes polyester fibres in boiling tetrachlorethylene to give greenish-tinged yellow shades.

EXAMPLE 3

4.4 parts of 4[N-ethyl-N-2'-(4"methylphenylsulphonylamidocarbonyl)oxyethyl]-amino-2-methylbenzylidenemalodinitrile, 22.5 parts of methyl iodide, 20 parts of potassium carbonate and 100 parts by volume of methyl ethyl ketone are boiled for about 5 hours under reflux. When the starting product is no longer visible in the thin layer chromatogram, the reaction mixture is cooled and the potassium salts are filtered off. The filtrate is evaporated and the dyestuff of formula

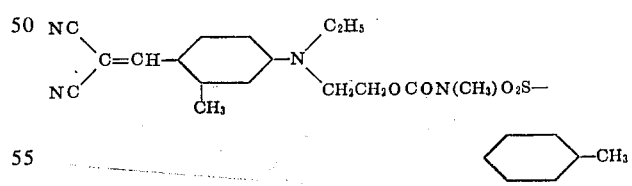

is isolated. It dyes polyester fibres from an aqueous bath to give greenish-tinged yellow shades.

The dyestuffs given in Table 1, corresponding to the formula

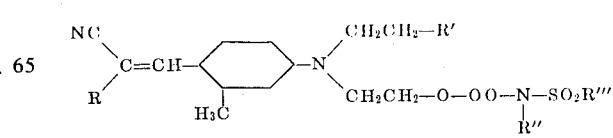

TABLE 1

| | R | R' | R'' | R''' | Shade on polyesters |
|---|---|---|---|---|---|
| 1 | —CN | —H | —$C_2H_5$ | -phenyl-$CH_3$ | Greenish-tinged yellow. |
| 2 | —CN | —H | —H | —$CH_3$ | |
| 3 | —CN | —H | —$CH_3$ | —$CH_3$ | Yellow. |
| 4 | —CN | —OCONSO$_2$R'''  (R'') | —H | -phenyl-$CH_3$ | |
| 5 | —CN | Same as above | —H | -phenyl- | Do. |
| 6 | —CN | do | —$CH_3$ | -phenyl-$CH_3$ | Greenish-tinged yellow. |
| 7 | —CN | do | —$CH_3$ | -phenyl- | Do. |
| 8 | —CN | do | —$C_2H_5$ | -phenyl-$CH_3$ | Do. |
| 9 | —CN | do | —H | —$CH_3$ | |
| 10 | —CN | do | —$CH_3$ | —$CH_3$ | Do. |
| 11 | —COO$C_2H_5$ | —H | —H | -phenyl-$CH_3$ | |
| 12 | —COO$C_2H_5$ | —H | —$CH_3$ | Same as above | Do. |
| 13 | —COO$C_2H_5$ | —H | —H | -phenyl- | Do. |
| 14 | —COO$C_2H_5$ | —H | —$CH_3$ | -phenyl-Cl | Do. |
| 15 | —$SO_2$-phenyl- | —H | —H | -phenyl-$CH_3$ | |
| 16 | Same as above | —H | —$CH_3$ | Same as above | Do. |
| 17 | do | —H | —H | —$CH_3$ | |
| 18 | do | —H | —$CH_3$ | —$CH_3$ | Do. | are obtained in an analogous manner.

EXAMPLE 4

19.0 parts of N-cyanethyl-N-β-hydroxyethylaniline, 20.0 parts of phenylsulphonylisocyanate and 100 parts by volume of toluene are heated for 3 hours under reflux. After cooling the product which has crystallised out, of formula

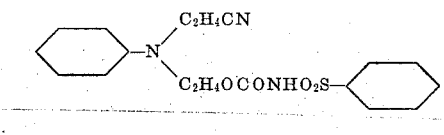

is filtered off, rinsed with a little toluene and dried.

13.8 parts of 1-amino-4-nitrobenzene are dissolved in 30 parts of water and 30 parts of concentrated hydrochloric acid. After adding 80 parts of ice, 6.9 parts of sodium nitrite are introduced. The mixture is stirred until the diazo solution is almost colourless. The diazo solution thus obtained is added to a solution of 37.3 parts of the product obtained according to paragraph 1 in glacial acetic acid at 0 to 5°C. After completion of the coupling the dyestuff is completely precipitated by adding water. The precipitated dyestuff of formula

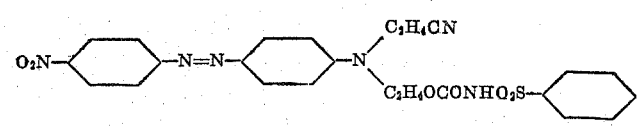

is filtered off, washed with water and dried. It dyes polyester fibres from a boiling solution in pure tetrachlorethylene (40 minutes) to give orange shades.

EXAMPLE 5

10 parts of N-cyanethyl-N-2-(4'-methylphenylsulphonylaminocarbonyl)-oxyethylaminobenzene, 57 parts of methyl iodide, 50 parts of potassium carbonate and 250 parts by volume of methyl ethyl ketone are boiled for 5 hours under reflux. The reaction mixture is then cooled and the potassium salts are filtered off. The filtrate is evaporated. The slightly yellowish oil is used for the coupling reaction.

3.5 parts of sodium nitrite are dissolved in 68 parts of sulphuric acid monohydrate. 8.15 parts of 1-amino-2-cyano-4-nitrobenzene are introduced at 15° to 20°C and well stirred. After 2 hours the solution is poured into 300 parts of ice water. The diazo solution thus obtained is added to an acetic acid solution of 20.05 parts of the oil obtained according to paragraph 1. The coupling mixture is rendered neutral to Congo Red by means of sodium acetate solution. After completion of the coupling the precipated dyestuff is filtered off, rinsed with water and dried. The dyestuff of formula

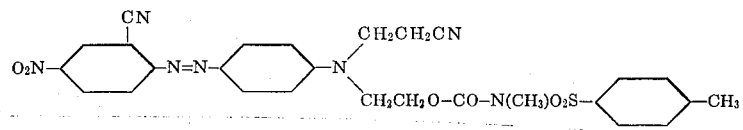

dyes polyester fibres in red shades having excellent fastness properties.

The dyestuffs of Table 2, which correspond to the formula

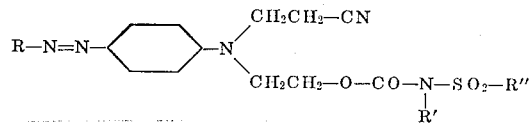

can also be manufactured according to the process described in Example 5.

TABLE 2

| | R | R' | R'' | Shade on polyester |
|---|---|---|---|---|
| 1 | NO₂-⬡- | —CH₃ | -⬡-CH₃ | Red. |
| 2 | Same as above | —H | -⬡- | Red. |
| 3 | do | —CH₃ | Same as above | Orange. |
| 4 | do | —C₂H₅ | -⬡-CH₃ | Reddish-orange. |
| 5 | do | —C₂H₅ | -⬡-Cl | Do. |
| 6 | do | —CH₃ | —CH₃ | Do. |
| 7 | NO₂-⬡(Cl)- | —CH₃ | -⬡- | Red. |
| 8 | Same as above | —C₂H₅ | -⬡-CH₃ | Red. |
| 9 | do | C₂H₅ | -⬡- | Orange. |
| 10 | do | —H | —CH₃ | |
| 11 | do | —CH₃ | —CH₃ | Yellowish-red. |
| 12 | NO₂-⬡(Cl)(Cl)- | —H | -⬡- | |
| 13 | Same as above | —CH₃ | Same as above | Orange. |
| 14 | do | —C₂H₅ | -⬡-CH₃ | Do. |
| 15 | do | —C₂H₅ | -⬡- | Do. |
| 16 | do | —H | —CH₃ | |
| 17 | do | —CH₃ | —CH₃ | Do. |
| 18 | NO₂-⬡(CN)- | —H | -⬡- | |
| 19 | Same as above | —CH₃ | Same as above | Claret. |
| 20 | do | —C₂H₅ | -⬡-CH₃ | Red. |
| 21 | do | —C₂H₅ | -⬡- | Red. |
| 22 | do | —H | —CH₃ | |
| 23 | do | —CH₃ | —CH₃ | Bluish-red. |
| 24 | NO₂-⬡(COOCH₃)- | —H | -⬡- | |

Table 2—Continued

| | R | R' | R" | Shade on polyester |
|---|---|---|---|---|
| 25 | NO₂—⟨⟩—SO₂CH₃ | | —H | Same as above |
| 26 | Same as above | —CH₃ | do | Red. |
| 27 | do | —C₂H₅ | —⟨⟩—CH₃ | Red. |
| 28 | do | —C₂H₅ | —⟨⟩—Cl | Red. |
| 29 | NO₂—⟨S⟩ | —CH₃ | —⟨⟩—CH₃ | Violet. |

EXAMPLE 6

0.5 parts of 50 percent strength sodium hydride dispersion are added to a solution of 3.1 parts of the urethane of N-cyanethyl-N-β-hydroxyethyl-aniline and phenylisocyanate (dissolved in 30 parts of dioxane). After 1 hour the sodium salt of the urethane had separated out as a voluminous white precipitate. The sludge was diluted with 50 parts of dioxane and mixed with 1.76 parts of benzenesulphonyl chloride. The mixture was stirred for 2 hours at room temperature, whereupon the white precipitate disappeared and sodium chloride precipitated in a fine form. After filtering and working up, a colourless oil was obtained, which corresponded to the formula

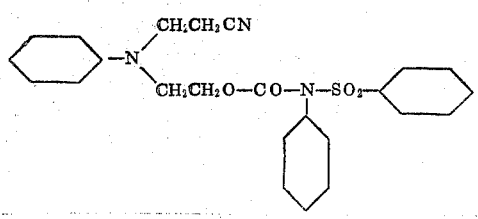

The sulphonylurethane of formula

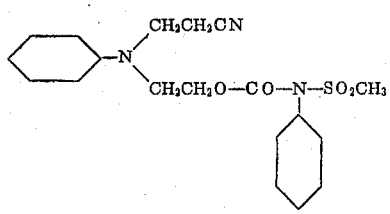

was obtained in an analogous manner.

1.72 parts of 2-chloro-4-nitroaniline were diazotised with nitrosylsulphuric acid and the filtered diazo solution was coupled with 4.5 parts of the product obtained in the first paragraph (dissolved in glacial acetic acid: propionic acid, 5:1). The resulting dyestuff corresponded to the formula

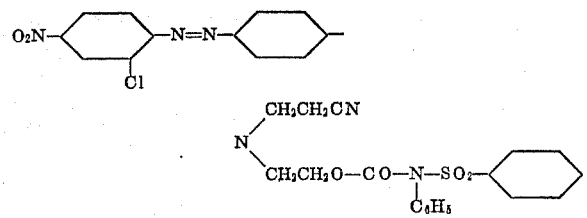

and dyed polyester fibres in red shades. The dyestuff of formula

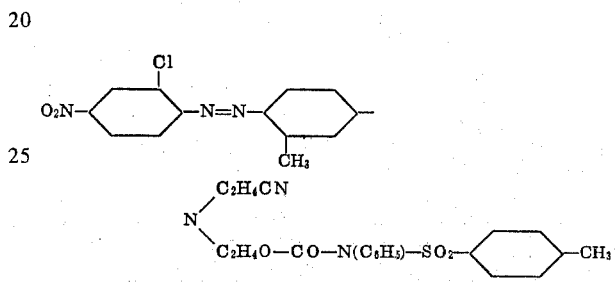

was manufactured in an analogous manner.

EXAMPLE 7

16.3 parts of 2-cyano-4-nitroaniline are introduced into 183 parts of 1 N nitrosylsulphuric acid. The diazo solution thus obtained is added to a solution of 43.7 parts of N-ethy-N-[β(phenylsulphonyl[methylamino]-carbonyl)-β-phenylamino]ethylaminobenzene in 600 parts by volume of ethylene glycol monoethyl ether. The resulting dyestuff of formula

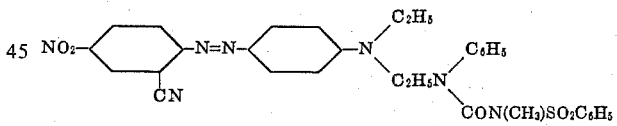

is precipitated by pouring out onto ice/water. It dyes acetate rayon, cellulose triacetate, nylon and polyester fibres in violet shades.

EXAMPLE 8

17.2 parts of 2-chloro-4-nitroaniline are introduced into 183 parts of 1 N nitrosylsulphuric acid. The diazo solution thus obtained is added to a solution of 41.1 parts of 3-N,N-dicyano-ethylamino-N(phenylsulphonylmethylaminocarbonyl)N-methylaniline (dissolved in 500 parts by volume of acetone). On buffering with sodium acetate and diluting the solution with water the dyestuff of formula

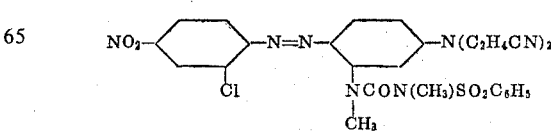

precipitates. It dyes acetate rayon, triacetate, nylon and polyester in red shades.

EXAMPLE 9

The dyestuff of formula

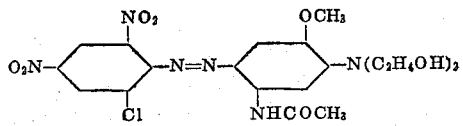

was dissolved in hot chlorobenzene and mixed with an excess of benzenesulphonylisocyanate. After 3 hours stirring at 130°C the solvent was evaporated off and the residue was taken up in acetone, mixed with dry potassium carbonate and with a three-fold excess of methyl iodide, and boiled for 12 hours under reflux. After cooling, the acetone solution was filtered and evaporated. The dyestuff of formula

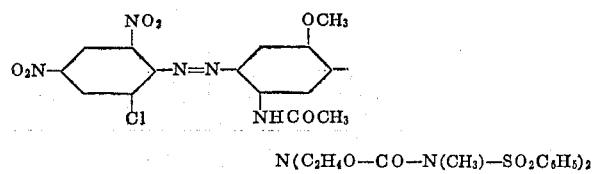

was obtained, which dyes polyester fibres in blue shades. The dyestuff of formula

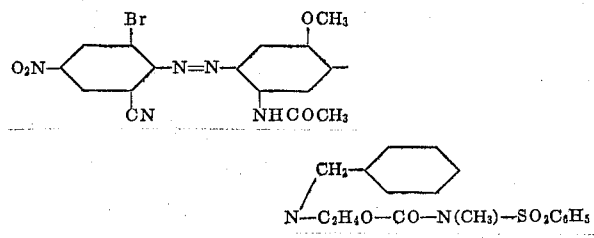

was manufactured in an analogous manner.

EXAMPLE 10

3-Amino-N,N-bis(β-acetoxyethyl)-aniline was dissolved in hot chlorobenzene, mixed with a 20 percent excess of benzenesulphonylisocyanate and stirred for 3 hours at 130°C. The resulting adduct was boiled for 12 hours under reflux with a three-fold excess of methyl iodide, in the presence of dry potassium carbonate, in methyl ethyl ketone. The compound of formula

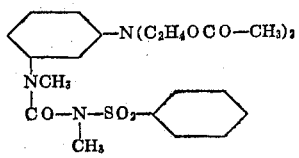

was obtained. On coupling with diazotised 2-chloro-4-nitroaniline a dyestuff was obtained which dyed polyester fibres in red shades.

EXAMPLE 11

0.5 parts of 50 percent strength sodium hydride dispersion were added to a solution of 3.1 parts of N-cyanethyl-N,β-phenylcarbamylethylaniline in 30 parts by volume of dioxane whilst stirring at room temperature. At 1 hour the sodium salt of the carbamate had separated out as a white voluminous precipitate. 1.72 parts of m-pyridinesulphonyl chloride were added whilst stirring and the mixture was stirred for 3 hours. The precipitated sodium chloride was filtered off. Working up of the dioxane solution yielded a colourless viscous oil of formula

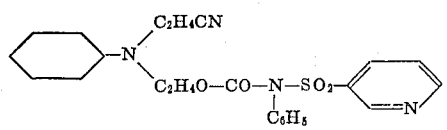

The above product was dissolved in glacial acetic acid and coupled with diazotised p-nitroaniline.

A red dyestuff of formula.

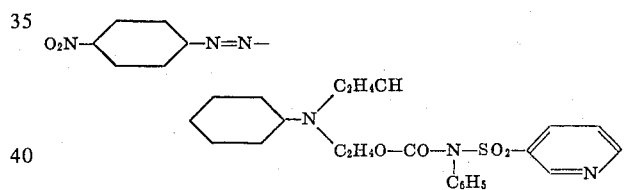

was produced. If diazotised 2-chloro-4-nitroaniline was used instead of diazotised nitroaniline, a dyestuff was obtained in an analogous manner.

EXAMPLE 12

7.14 parts of 4-(N-ethyl-N,2''-cyanethyl)amino-4'-sulphonamidoazobenzene are dissolved in 20 parts of dimethylformamide. 2.43 parts of triethylamine and 2.86 parts of phenylisocyanate are added and the mixture is stirred for 15 hours at room temperature. Thereafter the reaction mixture is poured onto water, the mixture is rendered acid and the precipitated dyestuff is filtered off; the residue is washed with water and dried.

7.3 parts of the product obtained above are dissolved in 1,200 parts of acetone and mixed with 30 parts of potassium carbonate and 30 parts of methyl iodide. The reaction mixture is heated for 4 hours under reflux. After cooling, the precipitated inorganic salts are filtered off and the filtrate is evaporated. The residue is triturated with water and filtered off. The dyestuff of formula

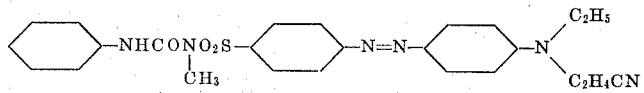

is obtained, which dyes polyester fibres in yellow shades of excellent fastness to sublimation.

If the dyestuff mentioned in column I is reacted with the sulphonylisocyanate mentioned in column II and the product is alkylated with the alkylating agent listed in column III, dyestuffs are obtained which dye polyester fibres in the shades mentioned in column IV.

EXAMPLE 14

2-(2'-hydroxyethoxy)-4-nitroaniline is diazotised and coupled to N-ethyl-N-(2-cyanethyl)aniline. 11.5 parts of the dyestuff thus obtained are dissolved in 75 parts of chlorobenzene. 8.25 parts of phenylsulphonylisocyanate are added dropwise. The mixture is stirred for 5 hours at 100°C and cooled. The precipitated dyestuff

| I | II | III | IV |
|---|---|---|---|
| $H_2NO_2S$—⟨⟩—N=N—⟨⟩(CH$_3$)—N(C$_2$H$_5$)(C$_2$H$_4$CN) | ⟨⟩—NCO | CH$_3$ | Orange. |
| $H_2NO_2S$—⟨⟩—N=N—⟨⟩—N(C$_2$H$_4$OCOCH$_3$)$_2$ | Same as above | CH$_3$ | Do. |
| $H_2NO_2S$—⟨⟩—N=N—⟨⟩—N(C$_2$H$_5$)(C$_2$H$_4$COOC$_2$H$_5$) | do | CH$_3$ | Do. |
| $H_2NO_2S$—⟨⟩(NO$_2$)—NH—⟨⟩ | do | CH$_3$ | Yellow. |

EXAMPLE 13

9.6 parts of 2,4-dinitro-4'-(2''-hydroxyethoxy)diphenylamine are dissolved in 200 parts of hot chlorobenzene. 8.25 parts of phenylsulphonylisocyanate are added dropwise and the mixture is stirred for a further 8 hours at 100°C. The reaction mixture is cooled and the precipitated dyestuff is filtered off, washed with chlorobenzene and dried.

5 parts of the product obtained above are dissolved in 45 parts of acetone and mixed with 20 parts of potassium carbonate and 20 parts of methyl iodide. The reaction mixture is heated for 4 hours under reflux. The inorganic salts are separated off by filtration and the filtrate is evaporated. The residue is then triturated with water and filtered off. The dyestuff of formula is filtered off, washed with a little chlorobenzene and dried.

5.66 parts of the dyestuff condensation product obtained in paragraph 1 are dissolved in 70 parts of acetone. 20 parts of potassium carbonate and 20 parts of methyl iodide are added. The reaction mixture is heated for 4 hours under reflux. The inorganic salts are then filtered off and the filtrate is evaporated. The residue is triturated with water and filtered off. The dyestuff of formula

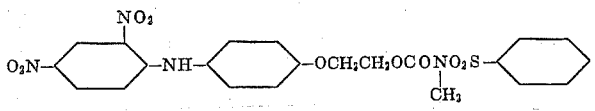

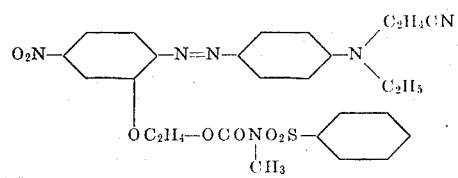

is obtained, which dyes polyester fibres in scarlet shades of very good fastness properties.

is obtained, which dyes polyester fibres in yellow shades of excellent fastness to sublimation.

If the dyestuffs mentioned in column I are reacted with the sulphonylisocyanate mentioned in column II and the resulting product is alkylated with the alkylating agent mentioned in column III, dyestuffs are obtained which dye polyester fibres in the shades given in column IV.

Dyestuffs are obtained in an analogous manner if the amines quoted in column I of the table below are diazotised, coupled with the coupling components mentioned in column II, and the resulting dyestuffs acylated with the sulphonylisocyanates mentioned in column III and finally alkylated with the alkylating agents mentioned in column IV. Dyestuffs are obtained which dye polyester fibres in the shades mentioned in column V.

| I | II | III | IV |
|---|---|---|---|
| (CH$_3$)$_2$NCO—⟨⟩(NO$_2$)—NH—⟨⟩—OC$_2$H$_4$OH | | ⟨⟩—SO$_2$NCO | CH$_3$I | Yellow. |
| (C$_2$H$_5$)$_2$NOC—⟨⟩(NO$_2$)—NH—⟨⟩—OC$_2$H$_4$OH | | Same as above | CH$_3$I | Do. |

| | I | II | III | IV | V |
|---|---|---|---|---|---|
| 1 | O₂N-⌬-NH₂, OC₂H₄OH | ⌬(Cl)-N(C₂H₅)(C₂H₄CN) | ⌬-SO₂NCO | CH₃I | Red. |
| 2 | Same as above | ⌬(CH₃)-N(C₂H₄OCOCH₃)₂ | CH₃-⌬-SO₂NCO | C₂H₅I | Red. |
| 3 | do | ⌬-N(C₂H₅)(C₂H₄COOC₂H₅) | ⌬-SO₂NCO | CH₃I | Red. |
| 4 | do | CH₃-indoline (CH₃) | Same as above | CH₃I | Orange. |
| 5 | do | HC=C-CH₃, HO-C, N-N-phenyl | do | CH₃I | Yellow. |
| 6 | HOH₄C₂O-⌬-NH₂ | OH-⌬-CH₃ | do | CH₃I | Do. |
| 7 | Same as above | OH-naphthyl | do | CH₃I | Orange. |
| 8 | HOH₄C₂O-⌬-N=N-⌬(OCH₃)(OCH₃)-NH₂ | ⌬-OH | do | CH₃I | Do. |

EXAMPLE 15

2-Chloro-4-nitroaniline is diazotised and coupled to 1-(2'-hydroxyethyl)-3-methylpyrazolone. 9.75 parts of the dyestuff thus obtained are dissolved in 150 parts of hot chlorobenzene. 8.25 parts of phenylsulphonylisocyanate are added dropwise and the mixture is stirred for a further 4 hours at 100°C. The reaction mixture is cooled, the precipitated dyestuff is filtered off and the residue is washed with chlorobenzene and dried.

5.1 parts of the dyestuff condensation product obtained in paragraph 1 are dissolved in 380 parts of acetone. 20 parts of potassium carbonate and 20 parts of methyl iodide are added and the reaction mixture is heated for 3 hours under reflux. The inorganic salts are separated off by filtration and the filtrate is evaporated. The residue is triturated with water and filtered off. The dyestuff of formula

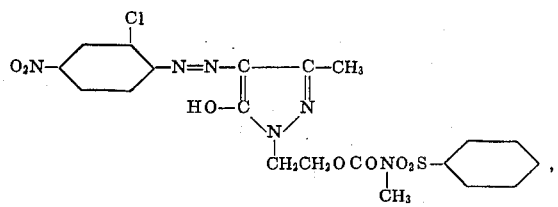

is obtained, which dyes polyester fibres and acetate rayon in yellow shades of excellent fastness properties.

Dyestuffs are obtained in an analogous manner if the amines quoted in column I of the table below are diazotised, coupled with the coupling components mentioned in column II, and the resulting dyestuffs acylated with the sulphonylisocyanates mentioned in column III and subsequently alkylated with the alkylating agents mentioned in column IV. Dyestuffs which dye polyester fibres in the shades mentioned in column V are obtained.

| I | II | III | IV | V |
|---|---|---|---|---|
| 1. H₃COOC—⟨⟩—NH₂ | HC═C—CH₃ / HO—C, N / N—C₂H₄OH | ⟨⟩—SO₂NCO | CH₃I | Yellow. |
| 2. ⟨⟩—CH₂COO—⟨⟩—NH₂ | Same as above | H₃C—⟨⟩—SO₂NCO | C₂H₅I | Do. |
| 3. O₂N—⟨⟩—NH₂ | HC═C—CH₃ / HO—C, N / N—⟨⟩—OC₂H₄OH | ⟨⟩—SO₂NCO | CH₃I | Do. |
| 4. O₂N—⟨CN⟩—NH₂ | HC═C—CH₃ / H₂N—C, N / N—C₂H₄OH | Same as above | CH₃I | Orange. |

EXAMPLE 16

4.57 parts of 4-aminophenacyltrimethylammonium chloride are dissolved in 20 parts of water and 7 parts by volume of concentrated hydrochloric acid are added. The solution is diazotised at 0° to 5°C by adding 5 parts by volume of 4 N sodium nitrite solution. The diazo solution is added at 0° to 5°C to a solution of 7.74 parts of N-cyanethyl-N-2(phenylsulphonyl[methylamino]carbonyl)-N',β -hydroxyethylaminobenzene in 30 parts of acetone. After completion of coupling the dyestuff is precipitated by adding salt. The dyestuff is filtered off, redissolved in hot water, and salted out of the filtrate after filtering the solution. The precipitated dyestuff of formula

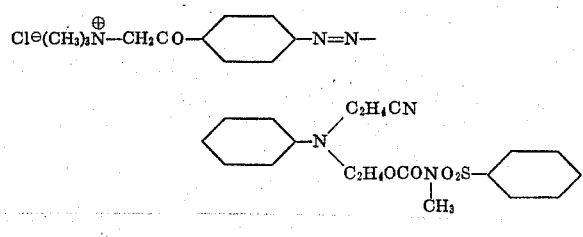

is filtered off and dried. It dyes polyacrylonitrile fibres in orange shades of excellent fastness properties.

If the amines mentioned in column I in the table below are diazotised and coupled as above with the coupling components mentioned in column II, dyestuffs are obtained which dye acrylic fibres and the shades mentioned in column III.

| I | II | III |
|---|---|---|
| Cl⊖(CH₃)₃N⊕CH₂CO—⟨⟩—NH₂ | ⟨⟩—N(C₂H₄CN)(C₂H₄OCONO₂S—⟨⟩—CH₃) with CH₃ / C₂H₅ | Scarlet. |
| Same as above | ⟨⟩—N(C₂H₄COOC₂H₅)(C₂H₄OCONO₂S—⟨⟩) with CH₃ | Do. |
| O₂N—⟨⟩—NH₂ with OC₂H₄N⊕⟨⟩ Cl⊖ | ⟨⟩—N(C₂H₄CN)(C₂H₄OCONO₂S—⟨⟩) with CH₃ | Do. |
| Cl⊖(CH₃)₃N⊕(CH₂)₃HNO₂S—⟨⟩—NH₂ | Same as above | Orange. |

EXAMPLE 17

7.6 parts of sodium nitrite are sprinkled at 0° to 10°C into 90 parts of concentrated sulphuric acid, the mixture is the heated to 65°C until everything has dissolved and is then cooled to 0°C, and 100 parts by volume of a mixture of glacial acetic acid and propionic acid, in the ratio of 6:1, are added dropwise. 19.4 parts of 6-ethoxy-2-aminobenzthiazole, dissolved in 100 parts by volume of a mixture of glacial acetic acid and propionic acid (6:1) are added dropwise to the resulting solution and the reaction mixture is stirred for a further 3 hours at 0° to 5°C. 7.5 parts of urea are then added in portions to this diazo solution. The diazo solution thus obtained is added, at 0° to 5°C, to a solution of 38.7 parts of N-cyanethyl-N-2(phenylsulphonyl-

[methylamino]carbonyl)-oxyethylaminobenzene in 150 parts of acetone. The coupling mixture is rendered neutral to Congo Red by means of sodium acetate solution. After completion of the coupling the solution is filtered and the dyestuff is washed with water and dried.

8.9 parts of the dyestuff obtained above are dissolved in 150 parts of warm chlorobenzene. A solution of 2.85 parts of dimethylsulphate in 20 parts of chlorobenzene is added dropwise and the reaction mixture is stirred for a further 4 hours at 95° to 100°C. The mixture is then cooled and filtered. The filter cake is dissolved in hot water and filtered to clarify the solution. The filtrate is salted out. The precipitated dyestuff of formula

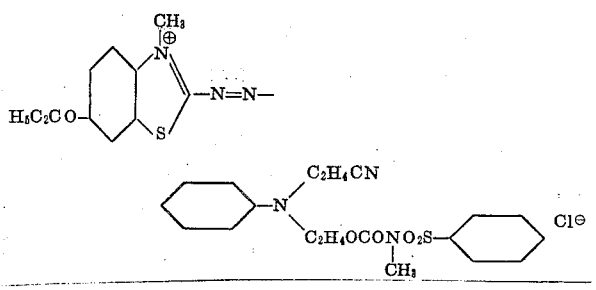

is filtered off and dried. It dyes polyacrylonitrile fibres in blue shades of excellent fastness properties.

Dyestuffs are obtained in an analogous manner if the diazo compounds of the amines quoted in column I are coupled with the coupling components mentioned in column II and the dyestuffs are treated with the alkylating agents mentioned in column III. The dyestuffs dye acrylic fibres in the shades given in column IV.

EXAMPLE 18

A mixture of 6.8 parts of 1-amino-4-p-toluenesulphonylamino-2-(β-hydroxyethyl)oxyanthraquinone, 6 parts of p-toluenesulphonylisocyanate and 200 parts of toluene is stirred for 7 hours at room temperature and the dyestuff of formula

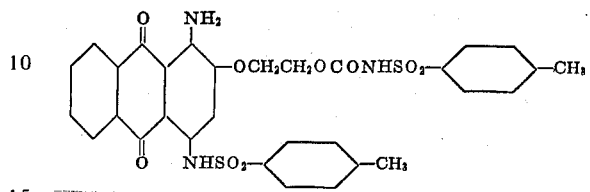

is obtained as a light orange powder by filtering, washing the residue with ether, and drying.

A mixture of the sulphonylurethane obtained above, 2.5 parts of dimethylsulphate, 2.7 parts of anhydrous potassium carbonate and 250 parts of dry acetone is boiled for 24 hours under reflux. An orange-red powder is isolated from the acetone extract, which represents the dyestuff of formula

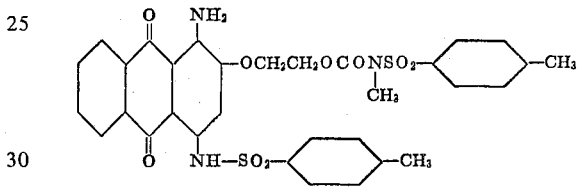

and dyes polyester fibres in reddish-orange shades.

EXAMPLE 19

A mixture of 6.8 parts of 1-amino-4-hydroxy-2-(β-hydroxyethyl)oxyanthraquinone and 4 parts of p- toluenesulphonylisocyanate in 150 parts of chlorobenzene was stirred for 7 hours at room temperature. Working up yielded 50 parts of an orange powder which represents the dyestuff of formula

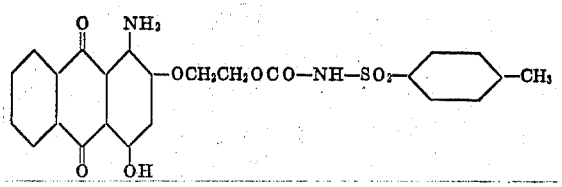

24.8 parts of the sulphonylurethane obtained above, 34 parts of anhydrous potassium carbonate, 31 parts of dimethylsulphate and 1,500 parts of acetone are boiled for 15 hours under reflux. After working up 25 parts of the methylated product were obtained as a violet powder which corresponds to the formula

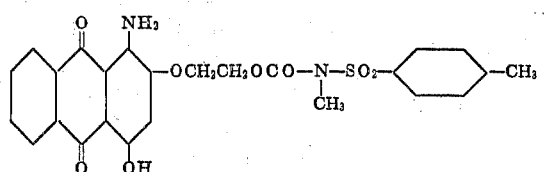

and dyes polyester fibres in bluish-tinged red shades.

EXAMPLE 20

A mixture of 12.5 parts of 1-methylamino-4-aminoanthraquinone, 18 parts of benzenesulphonylisocyanate and 1 part of pyridine in 150 parts of toluene is boiled under reflux for 3 hours. After cooling 21 parts of a light green powder precipitate, which corresponds to the formula

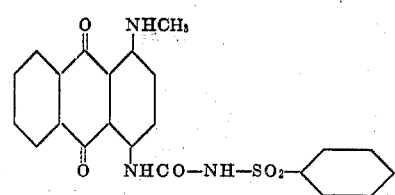

and dyes polyester fibres in violet shades.

If 25 parts of p-toluenesulphonylisocyanate were used instead of the benzenesulphonylisocyanate, 25 parts of a p-toluenesulphonylurea of formula

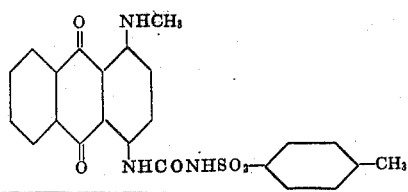

were obtained, which dyes polyester fibres in violet shades.

If the dyestuff obtained in the first paragraph (80 parts) was boiled with 113 parts of dimethylsulphate and 120 parts of anhydrous potassium carbonate in 1,000 parts of acetone under reflux for 12 hours, a blue powder was obtained which corresponds to the formula

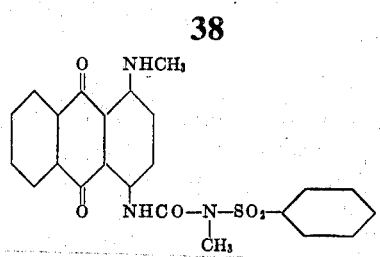

and dyes polyester fibres in violet shades.

EXAMPLE 21

A mixture of 24 parts of 1-amino-4-hydroxyanthraquinone, 1 part of pyridine, 18 parts of benzenesulphonylisocyanate and 1,500 parts of toluene is boiled for 3 hours under reflux. After cooling 40 parts of a reddish-orange powder are isolated, which corresponds to the formula

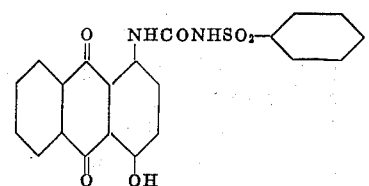

and dyes polyester fibres in orange shades.

If this dyestuff is methylated, a valuable dyestuff of formula

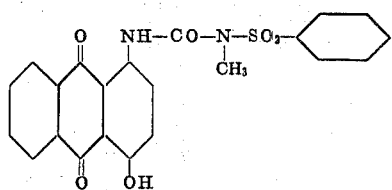

is obtained.

EXAMPLE 22

A mixture of 12.5 parts of 5-amino-1,9-isothiazoleanthrone, 0.5 parts of pyridine, 18 parts of benzenesulphonylisocyanate and 200 parts of toluene is heated for 4 hours under refulx. After cooling 22 parts of a yellow powder are isolated, which corresponds to the formula

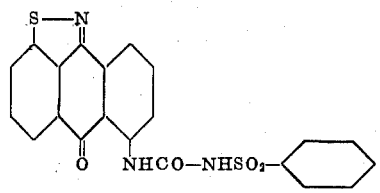

and dyes polyester fibres in yellow shades.

The compound of formula

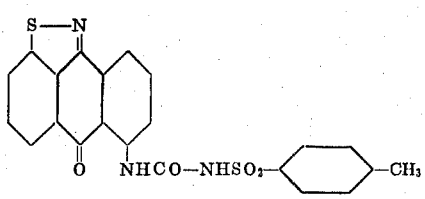

which dyes polyester fibres in yellow shades, is manufactured in an analogous manner.

EXAMPLE 23

A mixture of 15.5 parts of 1,4-dihydroxy-5,8-bis(β-hydroxyethyl)aminoanthraquinone, 40 parts of benzenesulphonylisocyanate and 1,000 parts of toluene is heated for 24 hours under reflux. The product which precipitates after cooling is filtered off, washed with ether and dried. It represents a bluish-violet powder which corresponds to the formula If the product obtained above is methylated in the usual manner, the methylated dyestuff is obtained as a blue powder which dyes polyester fibres in blue shades.

EXAMPLE 24

11 parts of 1,9-pyrazolanthrone are heated for 5 hours under reflux with 18.3 parts of benzenesulphonylisocyanate in 250 parts of toluene. After cooling a yellow powder precipitates which corresponds to the formula and dyes polyester fibres in yellow shades.

Methylation of the product obtained above yields the dyestuff of formula as a light yellow powder which dyes polyester fibres in yellow shades.

EXAMPLE 25

A mixture of 10.18 parts of 5-chloro-1,9-pyrazolanthrone, 16.4 parts of ethanolamine and 0.75 parts of triethylamine is stirred for 24 hours at 100°C. After cooling the mixture is added to water. The resulting reddish-brown powder corresponds to the formula 27.9 parts of the dyestuff obtained above are heated under reflux with 29.5 parts of p-toluenesulphonylisocyanate in 1,050 parts of toluene. After cooling orange crystals are obtained which correspond to the formula Methylation of the sulphonylurethane obtained above yields the methylated dyestuff which represents an orange-red powder and dyes polyester fibres in orange shades.

What we claim is:

1. A dyestuff which is free from sulfonic acid groups and which has the formula:

$$D-N=N-C-C-M$$
$$X_1-C\diagdown_N$$
$$N$$
$$(C_1-C_4\text{-alkylene or phenylene})-X-CO-NR-SO_2-R_2$$

wherein M is hydrogen, alkyl of one to three carbon atoms, phenyl, —CO—O(alkyl, of one to four carbon atoms or phenyl), $CONH_2$ or $CONH_2$ alkylated with one to four carbon atoms, R is hydrogen, methyl, ethyl, or phenyl; X is —O— or —$NR_1$— wherein $R_1$ is hydrogen or alkyl of one to four carbon atoms; $X_1$ is $NH_2$ or OH; $R_2$ is aryl of six to 10 carbon atoms and D is of the formula wherein a is hydrogen, chlorine, cyano, carbo-lower-alkoxy, or sulfonyl-lower-alkyl; b is nitro, sulphamoyl, di-lower-alkyl-carbamoyl, carbo-lower-alkoxy, or carbobenzyloxy; and c is hydrogen, cyano, chlorine, bromine, or nitro.

2. A dyestuff of claim 1 of the formula:

* * * * *